June 14, 1960 M. L. POOLE 2,940,731
DRILL BIT
Filed Jan. 21, 1955 2 Sheets-Sheet 1
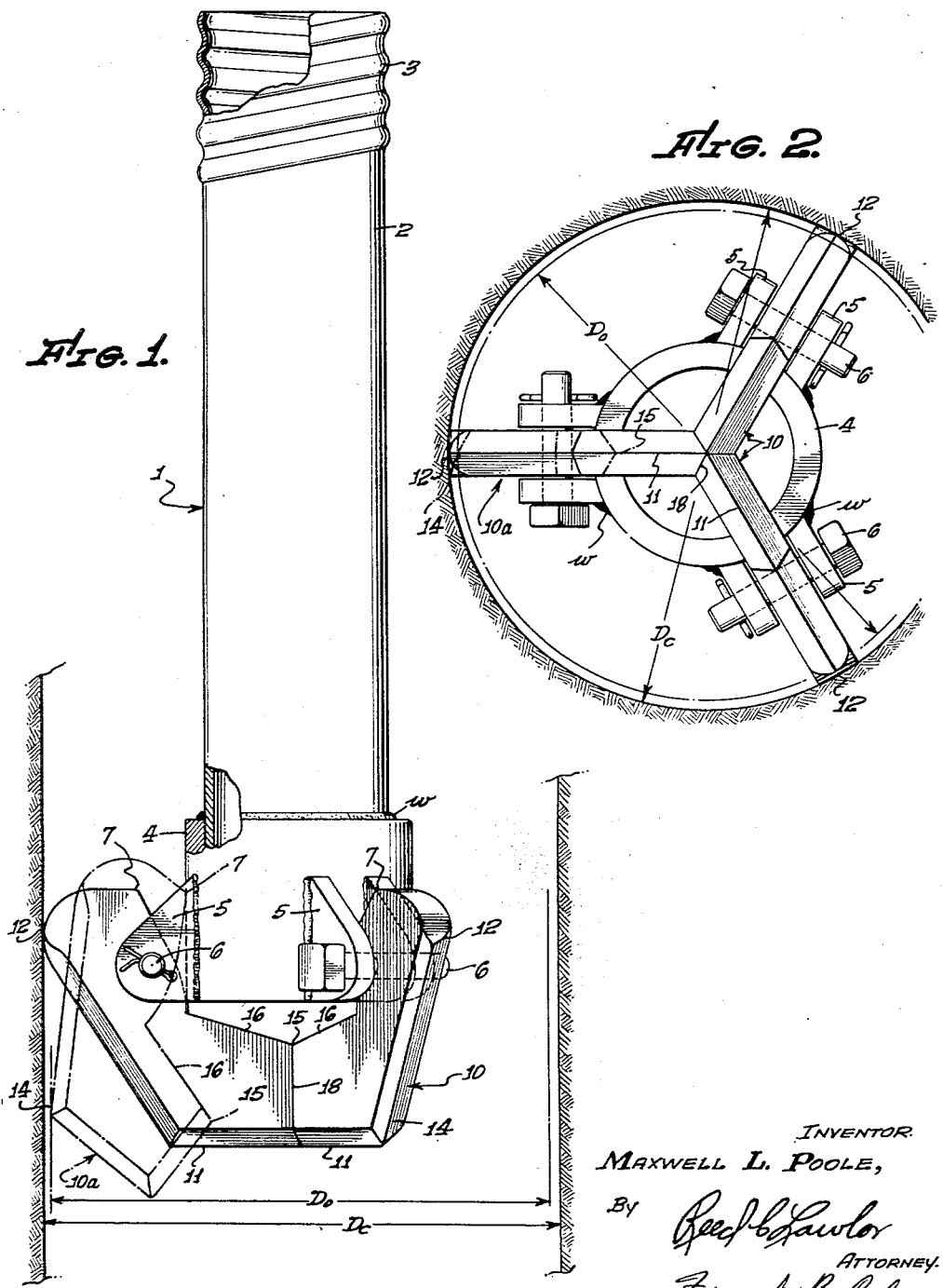
INVENTOR.
MAXWELL L. POOLE,
By Reed C. Lawlor
ATTORNEY.
Frank B. Coker
AGENT.

June 14, 1960 M. L. POOLE 2,940,731
DRILL BIT
Filed Jan. 21, 1955 2 Sheets-Sheet 2

INVENTOR.
MAXWELL L. POOLE,
By Reed C. Lawlor
ATTORNEY.
Frank L. Coker
AGENT.

United States Patent Office 2,940,731
Patented June 14, 1960

2,940,731
DRILL BIT

Maxwell L. Poole, Thibodaux, La., assignor to United Geophysical Corporation, a corporation of California Filed Jan. 21, 1955, Ser. No. 483,245

8 Claims. (Cl. 255—61)

This invention relates to the field of earth drilling equipment and more particularly to a drill bit especially adapted for use in drilling the shotholes employed in seismograph operations.

It is well known that one of the most important exploration tools employed in the search for petroleum deposits is the reflection seismograph. In the usual process of practicing this method, a shothole is drilled through the surface weathered layer of the earth. The depth of the hole may range from 10 or 20 feet to several hundred feet, depending upon the thickness of the unconsolidated surface layer at that position. In any event, it is usually desirable that the hole substantially penetrate the entire thickness of the weathered layer. A charge of high explosives, such as dynamite, is then placed in the bottom of the shothole and detonated. The resulting intense pressure pulse produces a seismic wave which travels outwardly from the hole in all directions. As the portions of this wave which are traveling downwardly encounter various strata exhibiting acoustic impedance variations, portions of the wave are reflected upwardly toward the surface and are received in part at detector stations spaced along a line on the surface of the earth. The seismic wave detectors produce electrical waves corresponding with the seismic waves received and the resultant electrical signals are amplified, filtered, and are ultimately recorded side by side as traces on a seismogram. In this way the family of traces represents the earth motions at the spaced detector stations.

In accordance with methods well known in the art, the times of arrival of the reflected waves received at the earth's surface are determined relative to the instant of detonation of the explosive charge. The entire surveying process is then repeated at a new position along a line on the surface of the earth in order to produce a substantially continuous series of measurements or "profiles" of reflection time intervals. From this information, maps are constructed of "reflection horizons" as related to geographical position. By properly interpreting these mapped horizons it is often possible to locate positions within the earth which are favorable for the accumulation of petroleum deposits.

In carrying out this seismograph process in certain areas, it has often been found that considerable expense is entailed in drilling suitable shotholes. In areas of intermediate drilling difficulty, the shotholes are commonly drilled with a standard drill bit and drill pipe arrangement which is afterward withdrawn from the hole. A light weight pipe called "shothole casing" is then forced down into the hole. In some cases water pressure is supplied to the top end of the casing in order to produce a washing action at the bottom, thus allowing the casing string to be lowered into the hole. In other cases an oversize casing section is placed in the hole and a smaller diameter hole is then drilled from the bottom of the casing downwardly into the earth by employing a smaller diameter drill bit and operating inside of the casing. After the desired depth has been reached, the drill bit and drill pipe are removed from the hole. In both of these instances, the explosive charge is loaded through the casing and into the lower portion of the hole. Thereafter, the casing may be withdrawn while the charge is detonated or it may be left in the hole during the detonation. In either event the drill must be withdrawn before lowering and detonating the charge.

In areas of greater drilling difficulty, the earth materials often tend to cave into the hole upon withdrawal of the drill stem. It is sometimes possible to reinforce the side walls of the hole during the drilling operation by adding various materials to the drilling fluid which is forced down through the central portion of the drill pipe during the drilling operation. Materials which have been useful in this respect including drilling mud, beet pulp, rice husks, and cottonseed meal. By maintaining a rotation of the drill stem within the hole and a simultaneous pressure of fluid containing such reinforcing materials, it is sometimes possible to "pack" the walls of the hole to temporarily increase their resistance to caving-in or intrusion of sand etc. and thus enable an explosive charge to be successfully loaded into the hole. However, such holes are seldom useable a second time and the handling of the "wall packing" materials is troublesome.

In certain difficult areas, however, such extreme measures as these are not even effective. More particularly, the problem becomes serious in areas where the weathered layer comprises certain types of unconsolidated materials in which the drilled holes will not remain open long enough to allow the charge to be loaded. Certain swampy areas such as exist along the Gulf Coast and, in general, areas containing sand, soft clay, and bentonic clay or uncemented gravels are particularly troublesome in this respect. Moreover, in these areas it is generally found to be impossible or inconvenient to insert shothole casing in the hole after withdrawal of the drill stem. Of course, if the hole caves in, it becomes impossible to load the charge and the expense of drilling the hole is lost.

In some of these difficult areas, common practice to overcome these difficulties has taken several main courses. The first method employed involves the use of a relatively inexpensive drill bit which is screwed on to the bottom of a length of shothole casing which is used as drill pipe. The casing sections are generally 10 feet long and have screw threads impressed on the ends thereof and can be screwed together to form a long continuous drill pipe of appreciable length. Although the casing is not of very heavy construction, it is nevertheless strong enough to be employed as drill pipe in many areas of interest. Using this combination of bit and shothole casing, the shot hole is drilled to the desired depth. Thereafter the casing string is left in the hole and the dynamite charge is loaded down through the casing and on top of the drill bit at the bottom of the hole. Finally the dynamite charge is detonated and the reflection seismogram is made. This process of course destroys both the lower section of the casing as well as the drill bit and therefore results in a considerable expense.

A second method employed in such difficult drilling areas has involved the use of a specialized drill bit which is fastened to the bottom of the drill pipe casing by means of a special taper joint which holds the two together during the drilling operations. When the hole has been drilled to the desired depth and the charge is ready to be loaded, a window sash weight is dropped down through the casing to knock the drill bit off the bottom of the drill pipe casing and into the bottom of the hole. The casing is then partially withdrawn and the explosive charge is loaded down through the casing and into the bottom of the hole. Finally, the charge is detonated and the reflection seismogram is made. In this method of operation a substantial saving in the cost of casing is obtained as compared with the first method above. However, the extra cost of the expendible taper joint drill bit is considerable. Moreover, a supply problem arises since a new drill bit is required for each hole.

A third method which has sometimes been used in certain of the very difficult areas comprises the sharpening and shaping of the lower end of a piece of casing in order that it alone can be used to provide the drilling action without the need for a separate drill bit. However, this method is only partially successful, particularly in swampy areas where old logs and tree trunks buried in the near surface of the ground are often encountered. In these cases it is necessary either to drill through the logs, or to push them out of the way, or to move the hole over to a new location. When the log cannot be pushed aside, the only method available is to move the hole to a new location since the sharpened casing type of bit is generally not capable of drilling through the log. Hence the result is an increased expense occasioned by redrilling the entire hole.

It is the purpose of the present invention to provide a new type of drill bit which overcomes many of the disadvantages of the equipment just discussed. More particularly, the improved bit is arranged to provide an inexpensive overall drilling operation in which the loading and detonation of charges in the borehole is brought about without the subsequent loss of any drill bits or casing. Moreover, the bit is rugged and simple and can easily drill through old logs or tree trunks when they are encountered.

These and other advantages inherent in the improved bit will become clear from the following description and the accompanying drawings in which like reference numerals refer to like parts and in which:

Fig. 1 is a side view of the improved bit showing the drilling and loading positions.

Fig. 2 is an end view of the bit showing both drilling and loading positions.

Figure 3A:
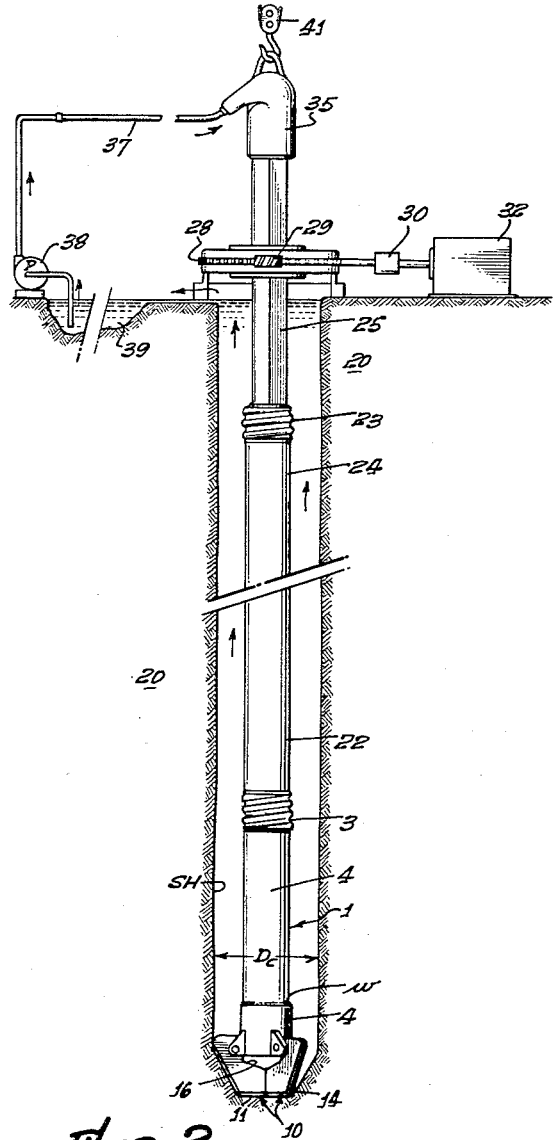

Fig. 3a schematically illustrates the process of drilling a shothole with the improved bit.

Figure 3B:
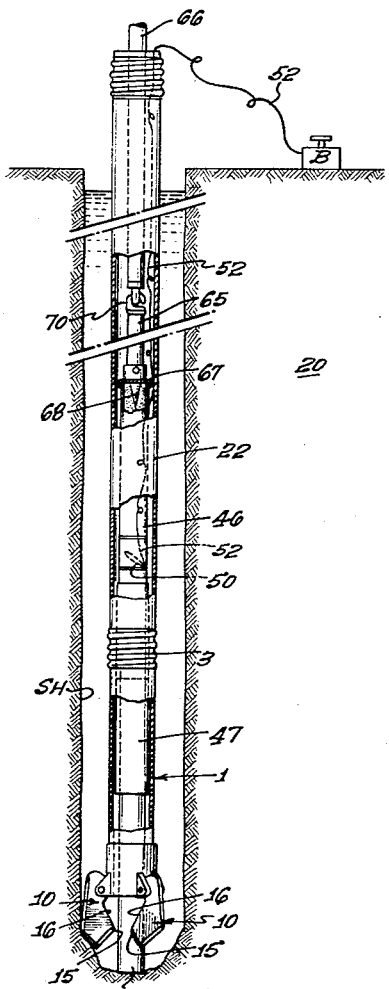

Fig. 3b schematically illustrates the process of loading an explosive charge through the partially withdrawn bit.

A side view of the improved drill bit 1 is shown in Fig. 1. In the particular embodiment illustrated, the bit 1 comprises a tubular body member 2 having threads 3 on the upper end thereof adapted for connection to the lower end of a section of casing which is employed as a lightweight drill pipe. A heavy steel collar 4 having an inside diameter about equal to the outside diameter of the tubular member 2 is rigidly affixed (as by welding w for example) to the lower end of the tubular member 2. Rigidly attached to the periphery of the lower portion of collar 4 are three pairs of steel blade supporting members or ears 5 which are welded to the collar 4 at equally spaced circumferential positions thus providing pairs of parallel supporting members for the axle pins 6. Three specially shaped earth cutting members in the form of drilling blades 10 are provided with holes adapted to receive the corresponding pin 6. In this way, each of the three blades 10 is held between a pair of the blade supporting members 5 in a manner such that it can rotate or swing between an inner or closed drilling position and an outer or open position. The blades move in vertical planes which are substantially parallel to the longitudinal axis of the tubular member 2. The lower end of the collar 4 is open thus providing a clear passage through the central portion of the tubular member 2 and the collar 4. The blades 10 are shown in the inner or drilling position by the solid lines. The dashed lines illustrate the outer or charge loading position of one of the drilling blades 10a. The particular shape of the drilling blades has a special purpose which will become clear in the discussion which follows.

More particularly, each of the blades 10 is flat and in practice is cut from a steel plate one half inch thick. A lower cutting edge 11 and an inwardly inclined cutting edge 14 are provided. The cutting edges 11 and 14 are sharpened or beveled to form dull knife-like edges in order to provide added cutting efficiency which aids in drilling through fallen trees or the like when they are encountered. The upper surface 16 of each blade is also inwardly inclined in order that a downward force applied thereto causes an outward swinging or expanding action of the blade about the pivotal axis of the pin 6. The hole in the blade through which the pin 6 passes is located above the projection of the surface 16 in this particular embodiment. In this way, when the bit is held vertically in a fluid such as air or water, the blades 10 hang in a position (not shown) which is intermediate the completely closed and completely open positions. The edge 18 of each blade meets the lower cutting edge 11 at substantially right angles.

In Fig. 1, the solid and dashed positions of blade 10a illustrate that each blade 10 swings about its pin 6 in order to move from the inner full line or drilling position to the outer broken line or charge-loading position. In the outer position, the corners 7 of the blades 10 contact the periphery of the collar 4 and thus prevent the blades from opening substantially more than the amount necessary to allow the cylinder of projection of the inside diameter of the tubular member 2 to pass inside of the circle defined by the three points 15 of the blades 10. It will also be observed that the overall maximum outside diameter $D_c$ offered by the blade portions 12 while in the drilling position is at least as great as the maximum diameter $D_o$ offered by the portions 14 of the blades when they are in the loading position. Therefore, the bit drills a hole in the earth which has substantially the diameter $D_c$. In accordance with the invention, the bit is thereafter raised above the bottom of the hole and a charge of dynamite is then thrust down through the central portion of the tubular member 2 to contact the downwardly sloping upper surfaces 16 of the blades 10. This thrusting action forces the blades to expand outwardly to the open position seen in Fig. 3b to allow the passage of the dynamite charge past the blades and into the bottom of the shothole. Due to the aforementioned relationship between the diameters $D_c$ and $D_o$, the diameter of the hole drilled in the earth is at least large enough to allow the drilling blades 10 to be expanded to their outer position, thus completely opening the central passage through the entire length of the drill bit. In this way the charge of dynamite can be readily loaded through the bit and into the bottom of the hole after the desired depth has been reached.

In order to more clearly illustrate the operation of the bit, reference is made to Fig. 2. Again the drilling blades 10 are shown by means of the solid lines in the closed or drilling position and the blade 10a is shown by the dot-and-wash lines in the open or loading position. In this figure it is particularly evident that a large central passage exists through the entire length of the drill bit, obstructed only by the drilling blades 10 when they are in their inner or closed position. However, when the blades 10 are expanded or withdrawn to their outer position, an unobstructed central passage is provided through the entire bit, including the blades.

The meeting edges of the blades 10 are beveled in order to create surfaces 18 which contact one another when the blades are in the closed or drilling position. The common line of contact of all three blades passes through the longitudinal axis of the tubular body member 2 when the blades are closed. In this way a composite lower drilling surface is created which is composed of three radial cutting edges 11 and which is positioned substantially at right angles to the longitudinal axis of the bit. At the same time the cutting edges 14 converge downwardly, the projections thereof meeting on the extension of the longitudinal axis of the bit and at a point below the juncture of the edges 11 and 18. Due to this construction, the bit always exhibits a centering action in the bottom of the hole and, in effect, creates a tapered seat therein having a flat bottom. Reference to Fig. 1 illustrates how the form of the surfaces 18 allows the blades 10 to come together along a central line and thereby create sturdy drilling surfaces or edges 11 and 14 which are capable of exerting considerable force on the bottom and tapered seat of the drill hole when the drill bit is axially loaded downwardly to increase the cutting efficiency. Moreover, the inclination of the outer edges 14 of the blades 10 causes a tight juncture to be formed between the surfaces 18 of the blades when the bit is forced against the tapered seat at the bottom of the hole.

Fig. 2 also illustrates in somewhat greater detail the general parallelism of the members of the pairs of blade supporting ears 5 and the welded sections w which hold them rigidly to the collar 4. The blades 10 are pivotally connected to the blade supporting members 5 by corresponding axle pins 6 which in turn are provided with a head on one end thereof and a hole suitable for receiving a cotter pin at the other end thereof. In this way the pins 6 are retained in the positions which support and define the axes of rotation of the blades 10.

The principle of operation of the bit is more clearly illustrated in Fig. 3a which shows the bit in the drilling position. In this figure the improved bit is shown drilling a shothole SH through the uppermost or weathered layer 20 of the earth. The improved drill bit 1 is screwed on to the lower end of a "string" consisting of several sections of shothole casing 22 screwed together and employed in the role of a drill stem or drill pipe. The threads 3 on the upper end of the drill bit mate with the threads on the lower end of the lowermost section of casing and form a rigid connection. The upper threaded section 23 of the uppermost portion of casing pipe 24 is screwed on to the lower end of the square kelly pipe 25. The kelly pipe is hollow and passes through a mating square bushing carried by the rotary table 28 which is adapted by means of a worm drive 29 and clutch and brake assembly 30 to be driven by the prime mover 32. In this way rotational motion of the kelly pipe 25 is produced which in turn forcibly rotates the entire string of drill pipe in the hole thereby causing the improved drill bit 1 to cut into the earth formations.

In addition, a swivel 35 is coupled to the top end of the kelly pipe 25 and in turn is supplied by a high pressure rubber hose 37 with a drilling fluid of water or mud from the pump 38. Due to the hollow nature of all of the drilling members employed, a continuous circulation of water and/or drilling mud is obtained down through the drill pipe column and out through the bottom central opening of the drill bit 1. This flow results in a washing action which carries the cuttings upward from the bottom of the hole. The pump intake extends into a mud pit 39 which is arranged to receive the upwardly flowing column of drilling fluid arising from the depths of the hole. The cuttings which are carried out of the hole by the drilling fluid settle out in the bottom of the mud pit 39. A block 41 supports the swivel and the drill pipe and the drilling operator has control of the force exerted upwardly on the block by virtue of a suitable winch (not shown). In some cases arrangements are also made for applying an additional downward force on the upper end of the kelly pipe to increase the drilling rate. However, this arrangement is not shown here.

In operation, the driller operates the clutch and braking device 30 and the prime mover 32 as well as the controls of the winch in such a manner as to maintain a uniform rotary motion of the drill bit 1 and a simultaneous application of a downward force to the bit. In most cases, the weight of the drill pipe will provide adequate force. However, as mentioned above, an additional downward force may be supplied if necessary to provide drilling action. At the same time the pump 38 supplies the flow of drilling fluid necessary to carry away the cuttings from the bottom of the drill hole and deposit them ultimately in the mud pit 39. As the bit 1 drills downwardly through the earth materials, the square kelly pipe 25 slides downwardly through the square bushing carried by the rotary table 28. When the swivel 35 approaches the top of the rotary table, the rotation is stopped and the entire string of drill pipe is raised upwardly in the hole by means of the block 41 until the threaded section 23 at the lower end of the kelly pipe rises a short distance above the top of the rotary table. In a manner well known in the art, a set of slips is then placed within the rotary table 28 and the drill string is allowed to hang on the gripping action of these slips. The kelly pipe 25 is then screwed out of the upper portion of the drill stem and a new section of drill pipe is engaged. By means of a pair of block supported slips (not shown) the upper end of the new section of drill pipe just attached is then lowered to within a few feet above the top of the rotary table 28 at which point the rotary table slips are again engaged with the drill pipe to hold it in a fixed position. The block supported slips are then removed and the kelly pipe 25 is screwed to the upper portion of the new drill pipe section and the entire drill string is then lowered into the hole until the bit engages the bottom. Thereafter the drilling operation is resumed, the kelly pipe being rotated by means of the square bushing (not shown) in the rotary table 28. By repeatedly following this process, a hole is drilled in the earth to the desired depth.

As schematically illustrated in Fig. 3, the side walls of the hole are relatively straight and conform to the outside diameter of the drill bit. However, in areas of greatest utility of the present improved drill bit it often occurs that the walls of the drilled hole are substantially continuously caving in and are therefore in contact with the outer walls of the drill stem 22. No attempt has been made in the drawings to represent this caving effect. In these cases, however, it will be understood to be substantially impossible to withdraw the drill pipe 22 from the hole and thereafter load a series of charges of dynamite into the bottom of the hole. The more or less continual and unpredictable collapsing or caving in of the side wall formations precludes such a charged loading operation in many cases. However, in conformance with the basic principles of the present invention, it will be observed with reference to Fig. 3b that when the drill bit 1 is lifted a short distance above the bottom of the hole and a charge of dynamite in stick form is thrust down through a central passage of the drill column, the drilling blades 10 are forced open to provide an unobstructed central passage through the bit thus allowing the charge to pass into the lower portion of the drill hole. In this way the charge is loaded into the shothole without the necessity for ever withdrawing the drill stem more than a short distance above the bottom of the hole. Hence the improved bit operation allows the drill pipe to remain in the hole and hold back the sagging side wall material while the charge is loaded.

It will be understood that although the processes of drilling and loading the hole are illustrated with well defined walls for the hole SH, nevertheless the processes are both operative in substantially the same way when the side wall materials cave into the hole. More particularly the charge of explosive is forced into the mud and/or sand filled bottom of the hole while the drill stem is held off the bottom. If more than one series of sticks of dynamite is to be loaded, the drill stem is held at successively greater elevations from the bottom of the hole as the separate series are forced downwardly through the bit and on top of one another.

The charge of explosive employed in reflection seismogram work generally is made up of one or more cylindrical sticks of dynamite. In practice the total charge size may vary from about 2½ pounds to 50 pounds or more. In order to allow the ready handling of these explosive charges, they are commonly made up in the form shown schematically in Fig. 3b. For purposes of illustration, two sticks of dynamite 45 and 46 are shown coupled together by a heavy cardboard sleeve 47. The coupling sleeve 47 is about 18 inches long and covers about half of each stick. In this way the charge as a whole is easy to handle and by detonation of the upper stick the close proximity to the lower stick also assures thorough detonation of the lower stick.

The charge is detonated by means of an explosive cap 50 of the type which is ignited by means of an electric current. The cap 50 is thrust in an upwardly inclined manner into the side of the upper stick 46 of dynamite. In this way, any obstruction the charge may encounter as it is pushed down into the drill hole is inclined to push the cap even further into the stick rather than to dislodge it. The leadin wires 52 to the cap are tied in several half hitches around the dynamite stick and then extend to the surface of the earth through the interior portion of the drill pipe 22. For added safety the immediate region of the stick 46 in which the cap is lodged is usually taped (not shown), including the half hitches in the cap leads 52. In practice the cap leads 52 are connected to the electrical terminals of a blaster B which is adapted to supply sufficient current to cause reliable detonation of the cap.

In Fig. 3b, the upper end of the drill string 22 is suspended on a set of slips, which are supported by the winch of the shooting truck (not shown), the drilling truck generally having moved to a new location by the time that the shothole is ready to be loaded. The charge of dynamite 45 and 46 is forced downwardly through the drill pipe section 22 by a plurality of loading poles 65 and 66. The lowermost end of the pole 65 is fitted with a bronze cap 67 having a cup formed in the lower end thereof and a centrally extended prong 68 which is engaged with the upper portion of the dynamite stick 46. The loading poles are connected together by couplers 70 which are adapted for easy connection and disconnection at the surface, but are arranged so that they cannot part from one another when in the drill hole.

In practice the drill string 22 is suspended above the bottom of the shothole during the time that the charge of dynamite is forced down through the drill stem. As the charge engages the surfaces 16 of the drilling blades 10 it forces them to withdraw to the open or charge loading position, thus providing a free unobstructed central passage for the charge through the drill bit 1. When the charge contacts the bottom of the hole the drill string 22 is again raised upwardly while simultaneously applying downward pressure on the loading poles until the entire charge has been deposited in the lowermost region of the shothole SH. In certain formations, both hard and soft, it is sufficient to simply raise the bit above the bottom of the hole a distance about equal to the length of the charge. While the bit is so suspended, the charge is "poled down" through the bit and into the bottom of the hole. In other cases, such as sandy areas, it is sometimes necessary to simultaneously raise the bit and lower the charge; or the bit may be raised in small increments with intermediate lowerings of the charge by corresponding increments. In any event, however, the charge is forced through the drill stem and bit and lodged in the bottom of the hole.

After the charge has been loaded, the loading poles are pulled upward thereby dislodging the bronze cap 67 from the upper portion of the dynamite stick 46, thus leaving the charge in the bottom of the hole. Due to the generally soft mud-like characteristic of the bottom of the shothole SH the charge can usually be forced into the muddy portion a sufficient distance to produce appreciable holding forces on the charge when the loading poles are pulled upward to dislodge the bronze cap 67 from the charge. However, in addition to this effect, the portions 15 of the drilling blades 10 can also exert a downward force on the sticks of dynamite when the loading pole is pulled upward. In this way it is assured that the charge remains in the bottom of the hole after the removal of the loading pole therefrom. After the charge has been safely lodged in the bottom of the shothole SH, the drill string 22 is raised further until it is a safe distance above the explosive charge, i.e. until it is above the region in which the explosive forces are great enough to damage the drill bit or the casing section during the detonation of the charge. For explosive loads of about 2½ or 5 pounds of 60% high velocity dynamite, 10 or 20 feet separation between the charge and the lowermost portion of the drill bit is generally adequate.

When it is desired to reuse the shothole SH after a charge has once been detonated therein, it is sometimes expedient merely to suspend the drill pipe 22 at a safe distance above the charge and thereafter to redrill down into the desired depth. In some cases the hole SH is drilled deeper than necessary and successive charges are detonated at decreasing depths. In this case, the drill stem is successively raised 10 or 15 feet after each new charge is loaded. However, in other cases where it may be desirable to use the shothole SH only once, the charge may be loaded through the casing and bit and thereafter the entire drill string 22 may be withdrawn completely from the hole prior to detonating the charge. In carrying out this process the cap wires 52 are disconnected from the switch and batteries, and the cap wires are then pulled out of each of the separated sections of drill pipe or casing as they are removed one at a time. In this way, once the pipe has been completely removed from the hole, the lead wires 52 are still connected with the cap 50 residing in the charge at the bottom of the shothole SH. In the manner well known to the art, operation of the blaster B causes detonation of the explosive charge and results in a strong elastic wave which is propagated outwardly in all directions causing reflected wave energy to be received at the surface.

It will be understood from the foregoing disclosure that the improved drill bit provides substantial advantages in the efficient drilling of shotholes in certain areas in which the seismograph process is practiced. These advantages flow from the fact that by the use of this improved drill bit, a charge of explosive may be lowered to the bottom of a hole while the drill pipe that supports the drill bit prevents caving of the walls and the casing and drill bit may then be raised to a point where they will not be damaged by detonation of the charge.

Although only one form or embodiment of the invention has been disclosed, in detail, it should be understood that other forms are contemplated. For example, it is not necessary that the drill bit have an extended tubular body member since the collar may be provided with suitable screw threads to receive the lower end of the downwardly extending drill pipe. On the other hand, the collar need not be provided in cases where the blade supporting ears are fastened directly to the lower end of the tubular body member. Furthermore, although the cutting members are shown as blades which are pivoted, it will be understood that the cutting members may be movably attached to a tubular member in other ways without departing from the invention. Moreover, it is not necessary that light weight casing be used as drill pipe as disclosed herein, for in other instances it may be desirable to employ other forms of drill pipe. In any event it is only necessary that the centrally extending passage through the drill pipe string be large enough to accommodate the objects which are to be loaded therethrough.

It should also be recalled that it was previously stressed that the total outside drilling diameter $D_c$ offered by the bit in the drilling position should be at least as great as or greater than the total outside diameter $D_o$ of the bit in the loading position. In effect, however, this criterion need only be observed when the bit is actually employed to drill in materials which are substantially solid enough to be fairly rigid and self-supporting, at least in the bottom portion of the hole where the mode of operation of the bit is changed from the drilling to the loading positions. Perhaps a more important criterion involved in carrying forth the basic principles of the invention is that of providing in the open or loading position a passage through the central portion of the drill bit which is substantially unobstructed by the blades. Thus it will be apparent that when drilling in soft, swampy materials, the drilling blades may be forced into the open or charge loading position by downward force on the explosive charge, even though the outer edges of the blades may be forced into the walls of the hole. Or in other words, for these cases, the diameter $D_c$ need not necessarily exceed the diameter $D_o$.

Although the disclosure given hereinbefore relates to the use of a rotary table and a prime mover mentioned as being normally mounted on a drill truck, the invention nevertheless has seen substantial use in the field when operated in other manners. For example, the improved bit has been employed to drill holes in an area in which the rotation of the drill pipe has been produced by a hydraulic rotary device. Moreover, when the improved bit is used in areas covered by swamps, it is often very difficult to transport a full size drill around in the area in order to drill the shotholes. Particularly in the swampy areas in which the operations just mentioned have been carried out, the shooting conditions are, in general, favorable and only one charge of explosive is detonated in each hole. For these cases it has proved efficient to load the charge of explosives through the drill pipe and the drill bit into the bottom of the shothole and thereafter to remove the entire drill pipe section from the earth. In this way the cap wires ultimately protrude alone from the swamp surface and are later connected to the blaster whereby the charge is detonated.

It will be understood from this brief discussion of the various modes of operation of the particular drill bit illustrated hereinabove, that the bit has great utility in drilling shotholes for seismograph prospecting. Moreover, it will be understood that explosive changes to be loaded through the bit and into the hole bottom, exemplify other objects such as transducers that can also be placed at known positions below the surface of the earth by employing the improved bit. When the bit is employed to drill the holes which are thereafter occupied by transducers such as seismometers, for example, it will be understood that the drilling and loading operations are substantially the same as described hereinabove for the cases when explosive charges were loaded. In general the instruments to be "loaded" down through the central opening of the drill pipe and bit will be provided with electrical conductors which connect with instruments at the surface of the earth. Therefore, these connecting wires are handled in substantially the same manner as the cap lead wires 52 are handled when explosive charges are involved.

When employing the improved bit to place seismometers beneath the surface of the earth, it is sometimes most efficient to drill the hole to the required depth, load the seismometer through the drill pipe and drill bit and into the bottom of the hole, and thereafter withdraw the drill pipe and bit upwardly an amount which is sufficient to prevent the transmission of unwanted vibrational disturbances down the drill pipe from the surface and into the sensitive seismometers. In other cases it is necessary to withdraw substantially the entire drill pipe from the hole prior to making the desired measurement in order to reduce this undesired disturbance factor to a suitable level. In any event, the seismometers employed for this type of measurement are provided with strength cables to allow the instruments to be withdrawn from the hole after the measurements have been completed.

It is to be understood that the apparatus and methods disclosed hereinabove are susceptible of various modifications wtihout departing from the spirit of the invention, and accordingly it is desired to claim the invention as broadly as the prior art permits.

I claim as my invention:

1. In combination with an earth drilling tool: a length of hollow drill pipe; a hollow drill collar secured to the lower end of said length of drill pipe, said pipe and collar providing a continuous vertical passage therethrough; hole drilling blades pivotally disposed in substantially vertical planes about said drill collar; and horizontal pivots mounting said blades about said drill collar on horizontal axes, said blades being normally swingable about said pivots in said substantially vertical planes, said blades having cutting edges swingable between generally vertical positions and generally horizontal positions, said blades having upper outer end portions extending radially outwardly beyond the respective pivots and upwardly above said respective pivots, said blades having lower inner end portions adapted to swing in under said continuous passage to obstruct said passage when in drilling position and adapted to be swung downwardly and outwardly about said pivots to clear said passage and provide for loading movement of an object through said passage and below said bit, the portion of each blade below its pivot overbalancing the portion above its pivot whereby said blades normally hang vertically in substantially freely swingable relation to said pivots to permit substantially unobstructed loading operations through said passage and past said blades when the apparatus is freely suspended above an earth surface, the portion of each blade below its pivot being adapted to swing each blade into a position under said passage with said lower inner end portions of said blades being disposed closely adjacent to one another thereby to obstruct such passage when the apparatus is lowered to a drilling position wherein lower edge portions of such blade physically contact an earth surface to be drilled.

2. The combination of claim 1, wherein said upper outer end portions of said blades include cutting edges, said pivots being mounted externally of said collar and positioning said cutting edges on said upper outer end portions of said blades outwardly of said pivots and collar when said lower edge portions of said blades are placed on an earth surface to be drilled, whereby said cutting edges on said upper outer end portions of said blades cut a hole of greater diameter than the diameter of the collar.

3. The combination of claim 1, wherein the upper outer end portion of each blade extends above its pivot and inward toward said collar to define an upper inner edge portion spaced from the adjacent outer portion of said collar when said blade and apparatus is in said drilling position, said upper inner edge portions of said blades being adapted to abut the adjacent outer wall portions of said collar and serve as a stop to limit outward swinging movement of such blade when said apparatus is suspended above an earth surface.

4. The combination of claim 1, wherein said lower inner end portions of said blades abut one another along a line lying substantially on the vertical axis of the drilling tool when said apparatus is in drilling position.

5. The combination of claim 1, wherein said blades include elongated cutting edges tapering downwardly and inwardly toward the tool axis from said upper outer end portions to said lower edge portions of said blades when said apparatus is in said drilling position whereby said elongated tapering cutting edges cut a tapering wall at the bottom of the hole being drilled.

6. The combination of claim 5 wherein said blades include further elongated cutting edges extending in generally horizontal directions, when said apparatus is in said drilling position, said further cutting edges extending from the lower ends of said elongated tapering cutting edges to said lower inner end portions of said blades.

7. A drilling tool as in claim 1 wherein said lower inner end portions of said pivoted drilling blades lie wholly below the locus of said pivots and the adjacent lower portion of said collar.

8. In combination in an earth drilling tool, a length of hollow drill pipe, blade supporting means attached to the lower end of said pipe, a plurality of hole drilling blades attached to said supporting means at plural pivotal attachment points spaced from one another about the circumference of said drill pipe adjacent the lower end thereof, each of said blades being of substantially planar configuration and extending in a substantially vertical plane, the planes of said blades being angularly disposed to one another and the extended planes of said blades intersecting one another substantially along the central axis of said drill pipe, said blades each being of generally L-shaped configuration with one leg of each said generally L-shaped blade being swingably attached adjacent an upper end thereof to one of said pivotal attachment points and with the other leg of each said L-shaped blade swingably extending across the bottom end of said hollow drill pipe, each of said blades including a first elongated cutting edge extending in a generally vertical direction along an outer edge of said one leg thereof, each of said blades further including a second elongated cutting edge extending in a generally horizontal direction along an outer lower edge of said other leg thereof from a position adjacent the lowermost end of said first cutting edge to a position closely adjacent the extended central axis of said drill pipe, said blades being swingable between a position wherein the innermost ends of said second cutting edges are substantially in contact with one another whereby said other legs of said blades obstruct the lower end of said hollow drill pipe, and a position wherein the innermost ends of said second cutting edges lie outward of said drill pipe central axis and adjacent the extended outer surface of said drill pipe thereby to effect a substantially unobstructed passage through said hollow drill pipe and past the lowermost edges of said blades.

References Cited in the file of this patent

UNITED STATES PATENTS

| | | |
|---|---|---|
| 391,501 | Andrews | Oct. 23, 1888 |
| 1,131,448 | Weathersby | March 9, 1915 |
| 1,737,960 | Cramer | Dec. 3, 1929 |
| 1,848,403 | Abegg | Mar. 8, 1932 |
| 2,058,287 | Anderson | Oct. 20, 1936 |
| 2,284,580 | Kammerer | May 26, 1942 |
| 2,300,813 | Savage | Nov. 3, 1942 |
| 2,472,710 | Koeln | June 7, 1949 |
| 2,496,954 | Prassel | Feb. 7, 1950 |
| 2,544,573 | Vincent | Mar. 6, 1951 |
| 2,644,670 | Baker et al. | July 7, 1953 |
| 2,663,546 | Kammerer | Dec. 22, 1953 |
| 2,665,886 | Ellis | Jan. 12, 1954 |
| 2,740,477 | Monaghan | Apr. 3, 1956 |
| 2,793,833 | Daniel | May 28, 1957 |
| 2,830,793 | Keese | Apr. 15, 1958 |